United States Patent [19]
Tukey et al.

[11] Patent Number: 5,787,422
[45] Date of Patent: Jul. 28, 1998

[54] METHOD AND APPARATUS FOR INFORMATION ACCESSS EMPLOYING OVERLAPPING CLUSTERS

[75] Inventors: John W. Tukey, Princeton, N.J.; Jan O. Pedersen, Palo Alto, Calif.

[73] Assignee: Xerox Corporation, Stamford, Conn.

[21] Appl. No.: 585,075

[22] Filed: Jan. 11, 1996

[51] Int. Cl.$^6$ .................................................. G06F 17/30
[52] U.S. Cl. ......................... 707/5; 707/6; 395/2.45; 395/11; 395/51
[58] Field of Search ........................ 395/605, 2.45, 395/11, 51; 707/5, 6

[56] References Cited

U.S. PATENT DOCUMENTS

| | | | |
|---|---|---|---|
| 3,568,155 | 3/1971 | Abraham et al. | 340/172.5 |
| 4,053,871 | 10/1977 | Vidalin et al. | 340/146.2 |
| 4,575,798 | 3/1986 | Lindstrom et al. | 364/300 |
| 4,774,655 | 9/1988 | Kollin et al. | 364/200 |
| 4,774,657 | 9/1988 | Anderson et al. | 364/200 |
| 4,839,853 | 6/1989 | Deerwester et al. | 364/900 |
| 4,956,774 | 9/1990 | Shibamiya et al. | 364/200 |
| 4,972,349 | 11/1990 | Kleinburger | 364/900 |
| 5,075,896 | 12/1991 | Wilcox et al. | 382/39 |
| 5,168,565 | 12/1992 | Morita | 395/600 |
| 5,257,365 | 10/1993 | Powers et al. | 395/600 |
| 5,263,120 | 11/1993 | Bickel | 395/11 |
| 5,414,797 | 5/1995 | Vassiliadis et al. | 395/51 |
| 5,442,778 | 8/1995 | Pedersen et al. | 395/600 |
| 5,608,840 | 3/1997 | Tsuboka | 395/2.45 |
| 5,706,497 | 1/1998 | Takahashi et al. | 707/5 |

OTHER PUBLICATIONS

Radecki, T. "A Theoretical Background for Applying Fuzzy Set Theory in Information Retrieval", Fuzzy Sets and Systems, vol. 10, No. 2, Jun., 1983, pp. 169-183.

Bhuyan et al. "Cluster-Based Adaptive Information Retrieval", Proceedings of the Twenty-Fourth Annual Hawaii International Conference on System Sciences, Kauai, Hawaii, 8-11 Jan. 1991, pp. 307-316.

Ghosh-Roy et al. "On-Line Legal Aid: Markov Chain Model for Efficient Retrieval of Legal Documents", IEEE Colloquim on Document Image Processing and Multimedia Environments, London, UK, 2 Nov. 1995, pp. 15/1-15/7.

Peter Willett; "Document Clustering Using an Inverted File Approach"; *Journal of Information Sciences;* (1980) 223-231.

"10th International Conference on Pattern Recognition"; *Understanding Multi-articled Documents;* Shuichi Tsujimoto and Haruo Asada; 1990 IEEE; pp. 551-556.

Peter Willett; "Recent Trends in Hierarchic Document Clustering: A Critical Review"; *Information Processing and Management;* vol. 24 No. 5 pp. 577-597, 1988.

Paul S. Jacobs, Bruce Croft; David Waltz; Working Notes; AAAI Spring Symposium Series; Mar. 27, 28, 29, 1990; Stanford University.

Doug Cutting, Per-Kristian Halvorsen; Jan Pedersen, and Meg Withgott; "Information Theater Verus Information Refinery"; Xerox Palo Alto Research Center; pp. 53-55.

Carolyn J. Crouch; *11th International Conference on Research & Development i Information Retrival;* "A Cluster-Based Approach to Thesaurus Contruction"; Jun. 13-15, 1988; pp. 309-320.

C.J. van Rijsbergen; *Information Retrieval-Second Edition;* Chapters 1-3, pp. 1-65; and Chapter 8 pp. 185-191.

*Primary Examiner*—Paul R. Lintz
*Attorney, Agent, or Firm*—Duane C. Basch

[57] ABSTRACT

The present invention is a method and apparatus for document clustering-based browsing of a corpus of documents, and more particularly to the use of overlapping clusters to improve recall. The present invention is directed to improving the performance of information access methods and apparatus through the use of non-disjoint (overlapped) clustering operations. The present invention is further described in terms of two possible methods for expanding document clusters so as to achieve the overlap, and a method for increasing precision through the use of the overlapped clusters.

11 Claims, 8 Drawing Sheets

FIG. 1
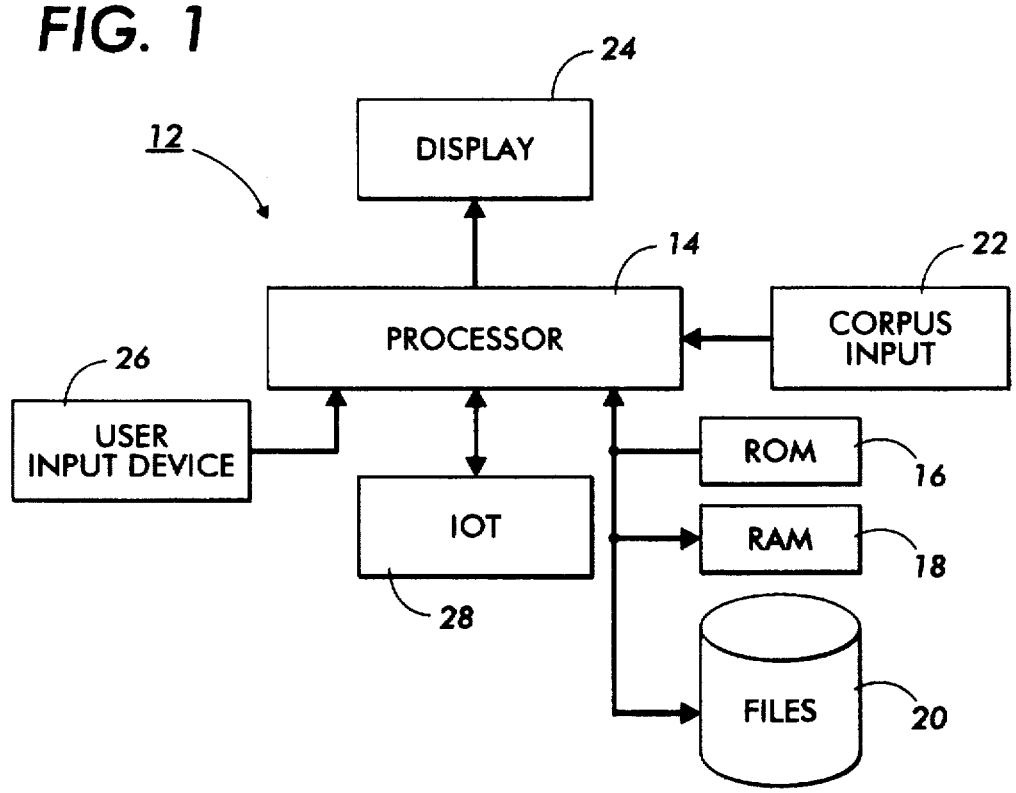
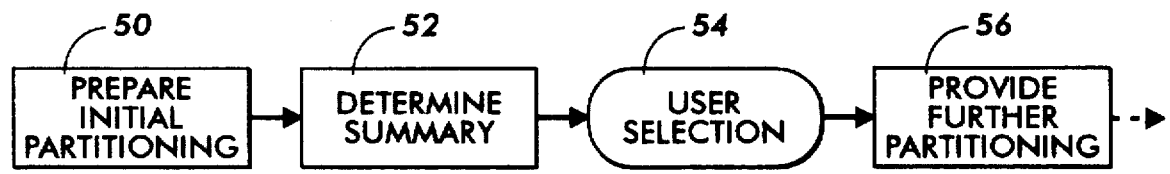
FIG. 2

FIG. 6

| Cluster 1 Size: 5 | Assistant Director Deputy Secretary Special Affair Division Adminis |
|---|---|
| 603252 | "Excepted Service; Consolidated Listing of Schedules A, B, and C Exceptions" |
| 329912 | "Excepted Service; Consolidated Listing of Schedules A, B, and C Exceptions" |
| 610814 | "5 CFR Part 737" |
| 317319 | "SES Positions That Were Career Reserved During 1988" |
| 334160 | "12 CFR Parts 7 and 32" |

| Cluster 2 Size: 187 | Deposit Capital Asset Insurance Rist Fail Save Credit Rate Marke |
|---|---|
| 631465 | "World Business (A Special Report); Eastern Europe - The Idea Man: France's Jacques Atxali |
| 658624 | "Politics & Policy: CIA Warned in '86 of Entry of BCCI to US - By Peter Truell Staff Reporter |
| 39340 | "House, Senate Versions Compared" |
| 402897 | "Under Fire: World Bank's Conable Runs Into Criticism On Poor Nation's Debt - Liberals Assa |
| 333197 | "Federal Reserve Bank Services" |

| Cluster 3 Size: 217 | Section Information 2 Requirement Regulation 3 Request Rule Re |
|---|---|
| 690665 | "Security is Big Business. (balancing security systems and user training to achieve data security) |
| 592791 | "Organization: Firm Credit System Financial Assistance Corp." |
| 322941 | "PART 78, EDUCATION APPEAL BOARD" |
| 334160 | "12 CFR Parts 7 and 32" |
| 334479 | "Privacy Act of 1974; Systems of Records" |

| Cluster 4 Size: 85 | Investigation Allege Fraud Court Lawyer Firm Prosecutor Jury Beci |
|---|---|
| 631459 | "The Sefra Affair: A Saga of Corporate Intrigue - The Vandetta: How American Express Orche |
| 662803 | "Kidder Advised US It Was Helping BCCI Buy an Interest in First American - By Peter Truell |
| 21620 | "High Court Refuses to Dismiss Helmsley Indictment" |
| 649610 | "The Americas: Peru; Another Link in the BCCI Money Laundering Chain? - By Alvaro Varga |
| 572658 | "Senior Banker Charged In Money Laundering Operation" |

| Cluster 5 Size: 7 | Marcos Phillippine Marcoses Unite Order Export Respondent Racket |
|---|---|
| 80628 | "Former Interior Minister Extradited to Miami on Drug Charges" |
| 37937 | "Prosecutors Seek Judgment Against Marcos Even in Event of Death" |
| 329041 | "Action Affecting Export Privileges; Marek Ciasiak" |
| 575028 | "Federal Grand Jury Indicts Marcos" |

FIG. 7

| Cluster 1 Size: 22 | Sentence Prision Juvenile Rough Levine Public Father National Lia |
|---|---|
| 664372 | "Law - Legal Beat: US Court Back Effort by Insurers To Avoid Liability in S&L Failures - By M |
| 59786 | "Ex-Director of NY Fed Sentenced to Six Months for Data Leak" |
| 631743 | "Thankless Task: Tough Young Clients Generate Tough Cases For a Public Defender - Philadel |
| 384732 | "Law: Bank Mergers May Be Complicated By Issue of Liability in Alamo Case" |

| Cluster 2 Size: 40 | Miami International Manager Credit Branch Customer Allegedly C |
|---|---|
| 389597 | "Former Employees At Financial Firms Are Indicted for Fraud" |
| 375395 | "US Charges Chrysler Altered Mileage on Cars - Indictment Says Employees Disengaged Odor |
| 572658 | "Senior Banker Charged In Money Laundering Operation" |
| 671309 | "Grand Jury Indicts BCCI, Three Men, Marking Renewal of US Prosecution - By Peter Truell S |
| 83940 | "Newsletter Capitalizes on New Money Laundering Regulations" |

| Cluster 3 Size: 124 | Security Tax Sec Trade Convict Seek Trial Judge Stock Kidder Hou |
|---|---|
| 21620 | "High Court Refuses to Dismiss Helmsley Indictment" |
| 643965 | "Law - Legal Best: Museum Claims That Miami Persecuted It - By Jose de Cordoba and Wade |
| 38624 | "Federal Judge Charged With Racketeering" |
| 21161 | "Milken Defense: Indictment Should Raise Storm Over RICC" |
| 366321 | "Bond Firm Says Indicted Aide Took a Leave - Goldberg Also Quits Board of Matthews & Wri |

| Cluster 4 Size: 76 | Loan Thrift Save Texax Real Estate S&L Fail Dallas Guilty Plead 19 |
|---|---|
| 519616 | "Texas Businessmen Indicted In Iowa Finance Scheme" |
| 46004 | "Seven Indicted On Charges of Defrauding Savings and Loans" |
| 36225 | "Former President of Dallas S&L Charged in Fraud Investigaton" |
| 361954 | "Two Pension - Fund Investors Indicted; US Alleges Kickbacks Paid Teamsters - By William Po |
| 366321 | "Bond Firm Says Indicted Aide Took a Leave - Goldberg Also Quits Borad of Matthews & Wri |

| Cluster 5 Size: 28 | American Clifford Safra Altman Executive Washington Cantor Per |
|---|---|
| 390026 | "Legal Quandary: Virginia Bank Buy-Out Raises New Questions On Attorney Conflicts - Clark |
| 658301 | "REVIEW & OUTLOOK (Editorial): First Indictments" |
| 642547 | "Capital Influence: How Clifford's Repute Protected Client BCCI From the Regulators - His St |
| 649610 | "The Americas: Peru; Another Link in the BCCI Money Laundering Chain? - By Alvaro Varga |

FIG. 8

METHOD AND APPARATUS FOR INFORMATION ACCESSS EMPLOYING OVERLAPPING CLUSTERS

This invention relates generally to a document clustering-based searching or browsing procedure for a corpus of documents, and more particularly to the use of overlapping clusters.

BACKGROUND AND SUMMARY OF THE INVENTION

Methods of searching or browsing a corpus of documents that involve repeated choice between a number of alternatives—each set of possible choices contained within that alternative selected at the previous stage of choice—suffer from a common difficulty. Once an incorrect choice is made, there is no way to recover. Wrong choices will be most frequent when the subset of documents being sought lie close to a boundary between one choice and another. The appropriate remedy to this problem is to arrange for decisions regarding the selection of choices not to be incorrect.

Since the choice is among bundles of documents, it is both convenient and suitable to refer to those bundles as clusters. Each cluster in the first stage of choices will be comprised of the documents belonging to the set of second stage clusters that correspond to it. And each second stage cluster will comprise corresponding third stage clusters, the subdivision continuing until the $n^{th}$ stage clusters are small enough to allow attention to individual documents.

Such procedures of stagewise choice have been used most frequently when access is based, interactively, on the user's judgment. Limitations of display methods and or the user's short-term memory make it infeasible to go at once to the many last-stage clusters. The difficulty arising from mistaken choices when what is sought falls near a division between clusters is often addressed by allowing the user to choose two or more clusters in indecisive situations. This leads to the proliferation of paths unless, as illustrated by the scatter-gather method taught in U.S. Pat. No. 5,442,778 to Pedersen et al., the clustering is always done "on the fly" at each stage of choice. This ameliorates the difficulty near the margins, but enforces an increase in the number of stages because of repeated doublings. The present invention attacks the previously noted difficulty more efficiently by planning for overlap at the margins—so that every cluster is moderately larger than a cluster from a corresponding set of disjoint (i.e., non-overlapping) clusters would be.

Stage-by-stage choice has not been commonly used in search methods that rely on a noninteractive specification of a query which is compared with whatever clusters are relevant. The costs due to taking account of the marginality problem have outweighed the reduced computational load that would be associated with a stage-by-stage approach. As a result, query-based systems usually rely on comparisons to the query with either every smallest cluster or even, most extremely, with each document. Either clearly avoids the marginality problem but at the cost of much more extensive computation. Here again overlapping clusters, where marginal cases belong to two or more clusters at each specific stage, can reduce the marginality problem, while preserving most of the computational savings.

Accordingly, the present invention is directed to improving the performance of information access methods and apparatus as the result of the use of non-disjoint (overlapping) clustering operations. Document clustering has been extensively investigated for improving document search and retrieval methods. In general, clustering relies on the fact that mutually similar documents will tend to be relevant to the same queries, hence, automatic determination of clusters (sets) of such documents can improve recall by effectively broadening a search request. Typically a fixed corpus of documents is clustered either into an exhaustive partition, e.g., disjoint, or into a hierarchical tree structure. In the case of a partition, queries are matched against clusters, and the contents of some number of the best scoring clusters are returned as a result, possibly sorted by score. In the case of a hierarchy, queries are processed downward, always taking the highest scoring branch, until some stopping condition is achieved. The subtree at that point is then returned as a result.

Hybrid strategies are also available, which are essentially variations of near-neighbor searching, where nearness is defined in terms of the pairwise document similarity measure used for clustering. Indeed, cluster search techniques are typically compared to similarity search, a direct near-neighbor search, and are evaluated in terms of precision and recall, as described by G. Salton and M. J. McGill in "Introduction to Modern Information Retrieval," McGraw-Hill, 1983. Also noted is G. Salton's "Automatic Text Processing," Addison-Wesley, 1989.

In order to cluster documents, it is necessary to first establish a pairwise measure of document similarity and then define a method for using that measure to form sets of similar documents, or clusters. Numerous document similarity measures have been proposed, all of which consider the degree of word overlap between the two documents of interest, described as sets of words, often with frequency information. These sets are typically represented as sparse vectors of length equal to the number of unique words (or types) in the corpus. If a word occurs in a document, its location in this vector is occupied by some positive value (one if only presence/absence information is considered, or some function of its frequency within that document if frequency is considered). If a word does not occur in a document, its location in this vector is occupied by zero. A popular similarity measure, the cosine measure, determines the cosine of the angle between two sparse vectors. If both document vectors are normalized to unit length, this is of course, simply the inner product of the two vectors. Other measures include the Dice and Jaccard coefficient, which are normalized word overlap counts. It is suggested that the choice of similarity measure has less qualitative impact on clustering results than the choice of clustering procedure. Accordingly, the present invention focuses on the method by which clusters are generated and does not rely on a particular similarity measure. Words are often replaced by terms, in which gentle stemming has combined words differing only by simple suffixes, and words on a stop list are omitted.

Standard hierarchical document clustering techniques employ a document similarity measure and consider the similarities of all pairs of documents in a given corpus. Typically, the most similar pair is fused and the process iterated, after suitably extending the similarity measure to operate on agglomerations of documents as well as individual documents. The final output is a binary tree structure that records the nested sequence of pairwise joints. Traditionally, the resulting trees had been used to improve the efficiency of standard Boolean or relevance searches by grouping together similar documents for rapid access. The resulting trees have also lead to the notion of cluster search in which a query is matched directly against nodes in the cluster tree and the best matching subtree is returned. Counting all pairs, the cost of constructing the cluster trees can be no less than proportional to $N^2$, where N is the number of documents in the corpus. Although cluster searching has shown some promising results, the method tends to favor the most determinationally expensive similarity measures and seldom yields greatly increased performance over other standard methods.

One stage methods are intrinsically quadratic in the number of documents to be clustered, because all pairs of similarities must be considered. This sharply limits their usefulness, even given procedures that attain this theoretical upper bound on performance. Partitional strategies (those that strive for a flat decomposition of the collection into sets of documents rather than a hierarchy of nested partitions) by contrast are typically rectangular in the size of the partition and the number of documents to be clustered. Generally, these procedures proceed by choosing in some manner, a number of seeds equal to the desired size (number of sets) of the final partition. Each document in the collection is then assigned to the closest seed. As a refinement the procedure can be iterated with, at each stage, a hopefully improved selection of cluster seeds. However, to be useful for cluster search the partition must be fairly fine, since it is desirable for each set to only contain a few documents. For example, a partition can be generated whose size is related to the number of unique words in the document collection. Accordingly, the potential benefits of a partitional strategy are largely obviated by the large size (relative to the number of documents) of the required partition. For this reason partitional strategies have not been aggressively pursued by the information retrieval community.

The standard cluster search presumes a query, the user's expression of an information need. The task is then to search the collection of documents that are identified as matching this need. However, it is not difficult to imagine a situation in which it is hard, if not impossible, to formulate such a query, or where the results of the query are voluminous. One merely has to consider an exemplary search on the Internet, and the potential for voluminous results, to gain an immediate appreciation for clustering-browsing functionality. As another example, the user may not be familiar with the vocabulary appropriate for describing a topic of interest, or may not wish to commit to a particular choice of words. Indeed, the user may not be looking for anything specific at all, but rather may wish to gain an appreciation for the general information content of the collection. It seems appropriate to describe this as browsing, since it is at one extreme of a spectrum of possible information access situations, including open-ended questions with a variety of possible answers.

In proposing an alternative application for clustering in information access the present invention is based upon methods typically provided with a conventional text book. If one has a specific question in mind, and specific terms which define that question, one consults an index, which directs one to passages of interest, keyed by search words. However, if one is simply interested in gaining an overview, one can turn to the table of contents which lays out the logical structure of the text for perusal. The table of contents gives one a sense of the types of questions that might be answered if a more intensive examination of the text were attempted, and may also lead to specific sections of interest. One can easily alternate between browsing the table of contents, and searching the index or, more importantly, an iterative combination of both.

Heretofore, publications have disclosed clustering techniques, the relevant portions of which may be briefly summarized as follows:

U.S. Pat. No. 5,442,778 to Pedersen et al., issued Aug. 15, 1995, for a "Scatter-Gather: A Cluster-Based Method and Apparatus for Browsing Large Document Collections." Pedersen et al., hereby incorporated by reference for its teachings, discloses a document clustering-based browsing procedure for a corpus of documents. The methods described for partitional clustering include a Buckshot method, a Fractionation method, both of which may be employed to produce input for a cluster digest method for determining a summary of the ordering of a corpus of documents in the Scatter-Gather technique. "Recent trends in hierarchic document clustering: A critical review" by Peter Willett, Information Processing of Management, Vol. 24, No. 5, pages 577–97 (1988—printed in Great Britain), describes the calculation of interdocument similarities and clustering methods that are appropriate for document clustering. "Understanding Multi-Articled Documents" by Tsujimoto et al., presented in June 1990 in Atlantic City, N.J. at the 10th International Conference for Pattern Recognition, describes an attempt to build a method to understand document layouts without the assistance of character recognition results, i.e., the meaning of contents.

P. Willett, in "Document Clustering Using an Inverted File Approach," Journal of Information Science, Vol. 2 (1980), pp. 223–31, teaches a method for generating overlapping document clusters.

As will be appreciated, various information access techniques use subdivision of the initial corpus, or one of its subcorpora, into clusters—often with the purpose of seeking the user's aid in selecting one or more clusters to serve as a subcorpus for a subsequent iterative stage. Conventionally, these clusters are selected so that (a) their union covers the whole of the initial corpus, and (b) the individual clusters are disjoint (non-overlapping). Unfortunately, disjoint clusters have practical disadvantages when the document that is sought falls near, or even across, a cluster boundary, so that at least two parallel clusters must be selected to avoid the loss of the document. The present invention, however, avoids the need for such parallelism and allows the user access to clusters that overlap so as to make choosing a single cluster both natural and efficient.

In accordance with the present invention, there is provided a method, operating in a digital computer, for searching a corpus of documents, comprising the steps of: preparing an initial structuring of the corpus into a plurality of overlapping clusters, wherein at least two of the plurality of overlapping clusters contain a single document; and determining a summary of the plurality of clusters prepared by said initial structuring of the corpus.

In accordance with another aspect of the present invention, there is provided a document browsing system for use with a corpus of documents stored in a computer system, the document browsing system comprising: program memory for storing executable program code therein; a processor, operating in response to the executable program stored in said program memory, for automatically preparing a structuring of the corpus of documents into a plurality of document clusters, wherein at least two of the plurality of document clusters overlap and contain at least one common document therebetween; data memory for storing data identifying the documents associated with each of the plurality of document clusters; processor summarizing the plurality of document clusters and generating summary data for said document clusters; and a user interface for displaying the summary data.

To provide the flexibility required to deal with nonspecific user's requirements, a browsing system usually requires means for broadening the working corpus as well as narrowing it. This invention preferably concerns the narrowing aspect and its description assumes tacitly the existence of broadening operations.

In accordance with yet another aspect of the present invention, there is provided a document search and retrieval method, operating in a digital computer, for searching a corpus of documents, comprising the steps of: identifying, in response to at least one search term, a sub-corpus of documents containing the at least one user specified search term; preparing an initial structuring of the sub-corpus into a plurality of overlapping clusters, wherein at least two of the plurality of overlapping clusters contain a single document; and determining a summary of the plurality of overlapping clusters prepared by said initial structuring of the sub-corpus.

In accordance with a further aspect of the present invention, there is provided a document searching system for use with a corpus of documents stored in a computer system, the document searching system comprising: program memory for storing executable program code therein; a processor, operating in response to the executable program stored in said program memory, for automatically preparing an structuring of the corpus of documents into a plurality of document clusters, wherein at least two of the plurality of document clusters overlap and contain at least one common document therebetween; data memory for storing data identifying the documents associated with each of the plurality of document clusters; memory access means for accessing the data memory and said processor summarizing the plurality of document clusters and generating summary data for said document clusters; and a user interface for displaying the summary data.

In accordance with yet another aspect of the present invention, there is provided a method, operating in a digital computer, for searching a corpus of documents, comprising the steps of: subdividing a corpus of documents into a hierarchical structure containing a plurality of levels of clusters, wherein at least two of the clusters on a particular level are overlapping clusters containing at least a single document in common; selecting, from the hierarchical structure, a plurality of clusters to form a subcorpus, wherein the subcorpus contains fewer document than the corpus; and identifying, in response to a search query, those documents in the subcorpus providing a positive response to the search query.

One aspect of the invention is based on the observation of problems with conventional document search and retrieval techniques—disjoint clustering—where a user can select only one cluster in order to obtain a particular document.

This aspect is based on the discovery of a technique that alleviates these problems by allowing documents within the corpus to be associated with a plurality of clusters, where such a technique would be characterized as having overlapping clusters. This technique can be implemented, for example, by clustering related documents into non-disjoint clusters. Here documents only moderately related to a particular attractor, or cluster vector, will also be moderately related to another attractor and will, therefore, be associated with both attractors (overlap). Thus, it is believed that this aspect of the invention not only favors recall, but may ultimately favor precision as well. Precision is favored because the present invention allows the user to initially review a broader range of documents and to subsequently focus on documents belonging only to a single inner cluster and to no other clusters.

A processor or computing machine implementing the invention can include a monitor or display to assist the user in the visualization of the clustering operation so as to allow "browsing" of the corpus in an orderly fashion. Such a display preferably shows the results of a query in a clustered format to enable the user to iteratively review documents within a corpus that relate to a desired topic.

BRIEF DESCRIPTION OF THE DRAWINGS

FIG. 1 is a block diagram of the hardware components used to practice the present invention;

FIG. 2 is a high level flowchart of a preferred embodiment of the document browsing method according to the present invention;

FIGS. 6, 7 and 8 are exemplary user interface screens displayed in accordance with the browsing operations depicted in FIG. 5.

Figure 3:
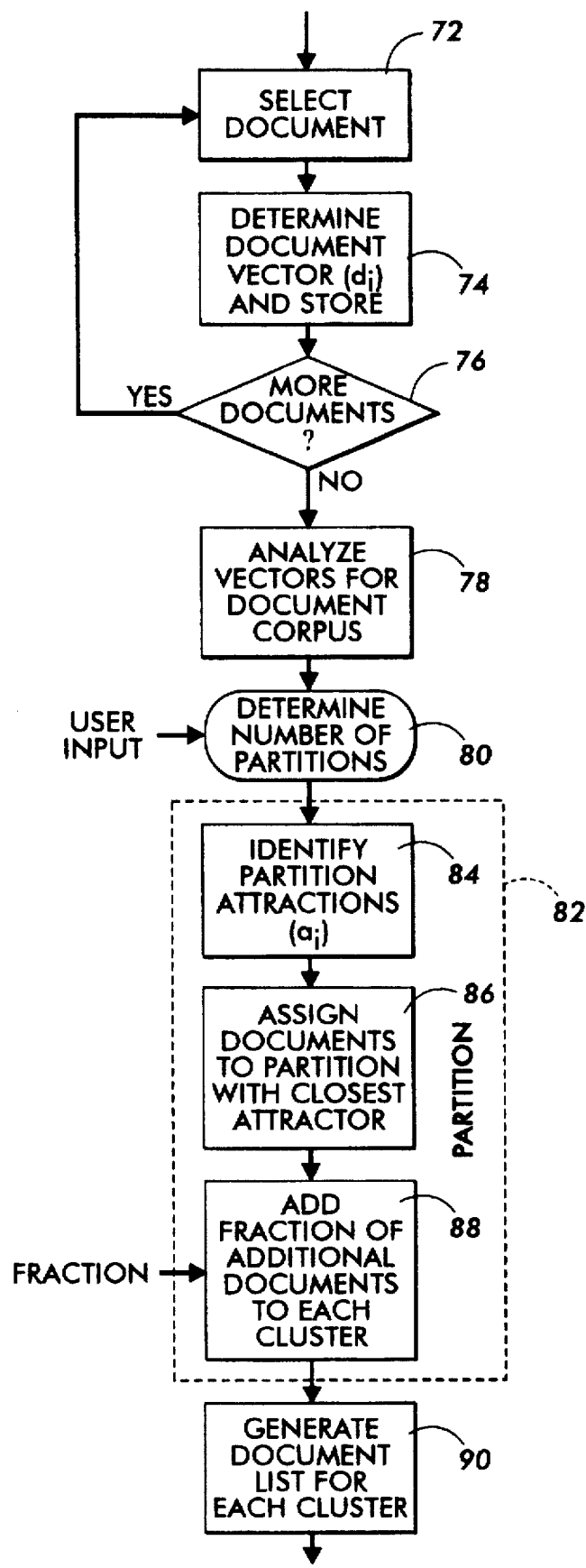
FIGS. 3 and 4 are flowcharts illustrating, in accordance with the present invention, details of the structuring operations depicted in FIG. 2.

The present invention will be described in connection with a preferred embodiment (e.g., iterative structuring of a document corpus), however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the present invention, reference is made to the drawings. In the drawings, like reference numerals have been used throughout to designate identical elements. In describing the present invention, the following term(s) have been used in the description.

A "document" as used herein refers to a digital medium of communication, including, but not limited to: bitmap image representations of hardcopy materials, electronically composed pages (e.g., ASCII or PDL formats such as Interpress® and PostScript®), e-mail or similarly transmitted messages, and equivalent manifestations of digital information. Documents may also contain images, text, graphics, sound, media clips and other elements therein. Furthermore, the present invention is intended for use with any type of document for which a similarity metric is determinable. The term "corpus" refers to a collection or set of documents. A "corpus" may be used to represent an entire collection of materials, or it may be used to represent a "sub-corpus" of a larger collection that is used as the input to the structuring methods described herein. As used herein to describe the results of searches conducted on a corpus, "precision" is the ratio of relevant documents retrieved to the total number of documents retrieved. "Recall" is the ratio of relevant documents retrieved to the total number of relevant documents.

A "feature" is an element of a document by which the document can be partially described so as to enable a similarity determination. A document may, for example, be represented as a one-dimensional array or vector of features, where the array contains an entry for each feature in the corpus to which the document belongs and where the document array has a non-zero entry to indicate that the feature occurs within the document. A feature may be a word, a statistical phrase, an algorithmically rotated coordinate (such as those obtained from singular value decomposition (SVD) analysis of the word by document matrix), or similar unit of understanding into which the document may be divided. SVD is a matrix factorization technique. Basically, a words versus document co-occurrence matrix is factored via SVD and only the highest weighted rotated pseudo-dimensions are retained to achieve a dimensionality reduction. Incorporated herein by reference is a publication describing the technique by Scott Deerwester, Susan T. Dumais, George W. Furnas, Thomas K. Landauer and Richard Harshman, "Indexing by latent semantic analysis." Journal of the American Society for Information Science, Vol. 41, No. 6 (1990), pp. 391–407, and the U.S. Pat. No. 4,839,853 patent to Deerwester et al., issued Jun. 13, 1989 for Computer Information Retrieval Using Latent Semantic Structure. The patent teaches a methodology for retrieving textual data objects. Presumed is an underlying, latent semantic structure in the usage of words in data objects. Estimates of this latent structure are utilized to represent and retrieve objects while the user query is recouched in a statistical domain and processed to extract the underlying meaning to respond to the query. The term "browsing" is used herein to describe the act of interactively choosing among clusters of one or more of a plurality of documents at successive stages. The standard formulation of a cluster search presumes a "query"—a user's expression of an information need. The task is then to search the corpus of documents for those documents meeting this need. However, the user may not wish or be able to furnish a query, be familiar with the vocabulary appropriate for describing a topic of interest, or may not wish to commit to a particular choice of words. Indeed, the user may not be looking for anything specific at all, but rather may wish to gain an appreciation for the general information content of the collection. This "search" is, therefore, characterized as browsing since it is not associated with a formal query; it is an open-ended process with a variety of possible results. Accordingly, the present invention facilitates the open-ended nature of the search spectrum by allowing a user to "browse" a corpus of documents that has been structured or divided into a plurality of related clusters.

The term "data" refers to physical signals that indicate or include information. When an item of data can indicate one of a number of possible alternatives, the item of data has one of a number of "values." The term "data" includes data existing in any physical form, and includes data that are transitory or are being stored or transmitted. For example, data could exist as electromagnetic or other transmitted signals or as signals stored in electronic, magnetic, or other form.

A "data storage medium" or "storage medium" is a physical medium that can store data. Examples of data storage media include magnetic media such as diskettes, floppy disks, and tape; optical media such as laser disks and CD-ROMs; and semiconductor media such as semiconductor ROMs and RAMs. As used herein, "storage medium" covers one or more distinct units of a medium that together store a body of data. For example, a set of floppy disks storing a single body of data would together be a storage medium.

"Memory circuitry" or "memory" is any circuitry that can store data, and may include local and remote memory and input/output devices. Examples include semiconductor ROMs, RAMs, and storage medium access devices with data storage media that they can access. A "memory cell" is memory circuitry that can store a single unit of data, such as a bit or other n-ary digit or an analog value.

A "data processing system" is a physical system that processes data. A "processor" is any component or system that can process data, and may include one or more central processing units or other processing components. A processor performs an operation or a function "automatically" when it performs the operation or function independent of concurrent human control. Typically such operations are executed in response to a series of code instruction stored in memory accessible by the processor. "Code" means data indicating instructions, but in a form that the processor can execute.

"User input circuitry" is circuitry for providing signals based on actions of a user. User input circuitry can receive signals from one or more "user input devices" that provide signals based on actions of a user, such as a keyboard or a mouse. The set of signals provided by user input circuitry can therefore include data indicating mouse operation and data indicating keyboard operation. Signals from user input circuitry may include a "request" for an operation, in which case a system may perform the requested operation in response.

A "hierarchical structure" is a structure that is perceptible as having a number of levels. A hierarchical node-link structure, for example, could have a number of levels of nodes, with links connecting each node on a lower level to one of the nodes on an upper level. A common characteristic of display systems is a mapping between items of data within the system and display features presented by the system. A structure "represents" a body of data when display features of the structure map one-to-one with the items of data in the body of data. For example, each node of a hierarchical node-link structure could represent a node in a tree of data or in another hierarchy of data items such as a directed graph that is organized into levels. The links of the structure can represent relationships between items of data, so that the links in a hierarchical node-link structure can represent hierarchical relationships such as parent-child relationships.

A "selectable unit" is a display feature that is perceived as a bounded display area that can be selected. For example, button 164 in FIG. 6. The term "select," when used in relation to a selectable unit, means a user input operation that includes a signal that uniquely indicates the selectable unit. In general, an action by a user "indicates" a thing, an event, or a characteristic when the action demonstrates or points out the thing, event or characteristic in a manner that is distinguishable from actions that do not indicate the thing, event, or characteristic. The user can, for example, use a pointing device such as a mouse to select a selectable unit by indicating its position and clicking a button on the pointing device. In general, a selectable unit may take any appearance, and is not limited to a visually distinguishable feature or set of features that appears to be a coherent unity.

An "image input device" is a device that can receive an image and provide an item of data defining a version of the image. A "scanner" is an image input device that receives an image by a scanning operation, such as by scanning a document.

An "image output terminal" (IOT) is a device that can receive data defining an image and provide the image as output, for example, in printed form. A "display" is an image output device that provides the output image in human viewable form. The visible pattern presented by a display is a "displayed image" or simply "image."

Referring to FIG. 1, the present invention can be implemented in a document corpus browsing system 12. The system includes a central processing unit 14 (processor) for receiving signals from, and outputting signals to various other components of the system, according to one or more programs run on central processing unit 14. The system includes a read only memory (ROM) 16 for storing operating programs in the form of executable code. A random access memory (RAM) 18 is also provided for running the various operating programs, and additional files on memory storage device 20 could be provided for overflow and the storage of structured corpora used by the present invention in performing a search operation.

Prior to performing a browsing operation, a document corpus is input from a corpus input 22. Corpus input 22 includes on-line search databases and Internet access capability so that the corpora may include an entire document database, or a subset thereof identified in response to a query. The corpus is then structured by central processing unit 14 in response to software code executed according to the teachings of the present invention.

Display 24 is provided for displaying results of structuring procedures, and for permitting the user to interface with the operating programs. A user input device 26 including, but not limited to, a mouse, a keyboard, a touch screen or combinations thereof is provided for input of commands and selections made by the user. An IOT 28 can also be provided so that documents, as well as printouts containing cluster digest summaries, may be rendered in hardcopy form.

The system 12 is preferably based in a digital computer that can implement an off-line preparation of an initial structuring using the non-disjoint (overlapping) clusters technique for the reasons discussed above. The system 12 also determines a summary of the top level structuring of the corpus which can be presented to user via display 24 or printer 28 for user interaction. After receiving appropriate instructions from a user via user input device 26, system 12 can perform a further structuring of the corpus again using the non-disjoint clustering technique described herein.

The browsing technique upon which the present invention is based can be demonstrated in more detail through reference to the general steps illustrated in FIG. 2. Subsequently, an example will be described showing the detailed steps and associated output data (output via a display or printer). Initially, step 50 prepares an initial structuring of the corpus, or subcorpus identified by a query. Once structured into a predefined number of overlapping clusters, a summary of each cluster is prepared at step 52. The summary is preferably a list of features, extracted from documents assigned to each cluster, representing the primary features for which the similarity clusters are grouped (e.g., the most frequently occurring features). The structuring, both initial and subsequent, is accomplished in accordance with the specific steps illustrated in FIG. 3. Once the subcorpus has been structured and summarized, it is then possible for a user to select a cluster, step 54, and to cause the system to further structure the selected cluster into the predefined number of clusters, step 56, once again with some or all of the clusters being overlapping (e.g., containing common documents). Although it would be possible for the user to select specific documents within the clusters at this point, it will be appreciated that further iterations of the structure-summarize-select steps may be conducted to further reduce the number of documents within individual clusters.

Referring now to FIG. 3, shown therein are more detailed steps of the structuring process employed by the present invention, as previously represented by steps 50 and 56 of FIG. 2. As will be understood by those skilled in the art, clusters are often defined by a set of attractors, each essentially a vector that summarizes the vectors of each document belonging to the cluster, e.g., a centroid of those vectors. As used in referring to a relationship between a vector and an attractor, the "closeness" is frequently evaluated in terms of the cosine of an "angle" between the vectors. The cosine of the angle may be represented as:

$$\Sigma a_i d_i \qquad (1)$$

when the attractor (vector) is $\{a_i\}$ and the document vector is $\{d_i\}$, and where $$\Sigma a_i^2 = d_i^2 = 1 \qquad (2)$$

As illustrated in FIG. 3, initially a document is selected (step 72) from the corpus or subcorpus, depending upon the input, and a document vector $\{d_i\}$, associated with the document is created (step 74). This process is repeated for each document via (test step 76) until each document is represented by a vector stored in memory. In a preferred embodiment, the vector memory is comprised of a single one-dimensional array for each document. After the document vectors are stored they are then analyzed (step 78), preferably using one of the analysis methods described by Pedersen et al. in U.S. Pat. No. 5,442,778. The analysis, in conjunction with the user input of the required number of cluster structures (step 80) results in a preliminary set of clusters. However, the present invention further modifies these clusters as is reflected by the structuring step 82. Specifically, structuring step 82 first identifies the specified number of attractors from the analyzed vectors (step 84) and then assigns each document to a particular cluster based upon its "closeness" to the cluster's attractor as, for example, described above. However, the present invention further modifies the closeness criterion, which would result in disjoint (non-overlapping) clusters. The modification of the clustering is accomplished by adding to each cluster at least one document found in another cluster. As illustrated by step 88, the number of additional clusters is determined as a fraction of the number of documents in each cluster. For example, if a cluster contained 50 documents after the disjoint clustering steps and a predefined fraction of ½ was defined, then the twenty-five next closest document vectors would identify twenty-five additional documents to be added to the cluster.

Figure 4:
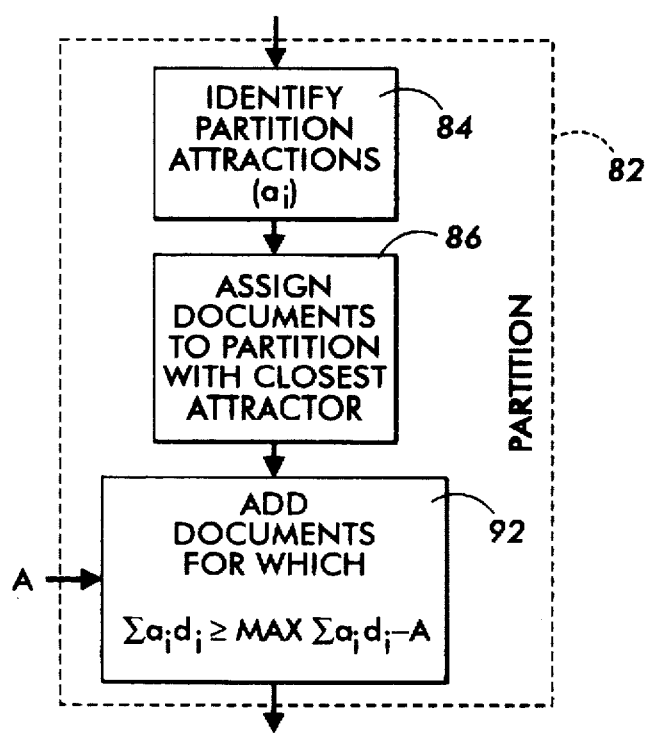

In the alternative embodiment illustrated in FIG. 4, the document addition rule of step 88 is replaced by step 92 in structuring operation 82, so that all documents having a cosine with the attractor falling within a range (A) of the maximum cosine between the document and any other attractor are added to the cluster. Expressed mathematically, the documents added to the cluster are those where:

$$\Sigma a_i d_i \geq {}_a{}^{MAX} \Sigma a_i d_i - A \qquad (3)$$

where the range of A is preferably from about 0.05 to about 0.10.

Figure 5:
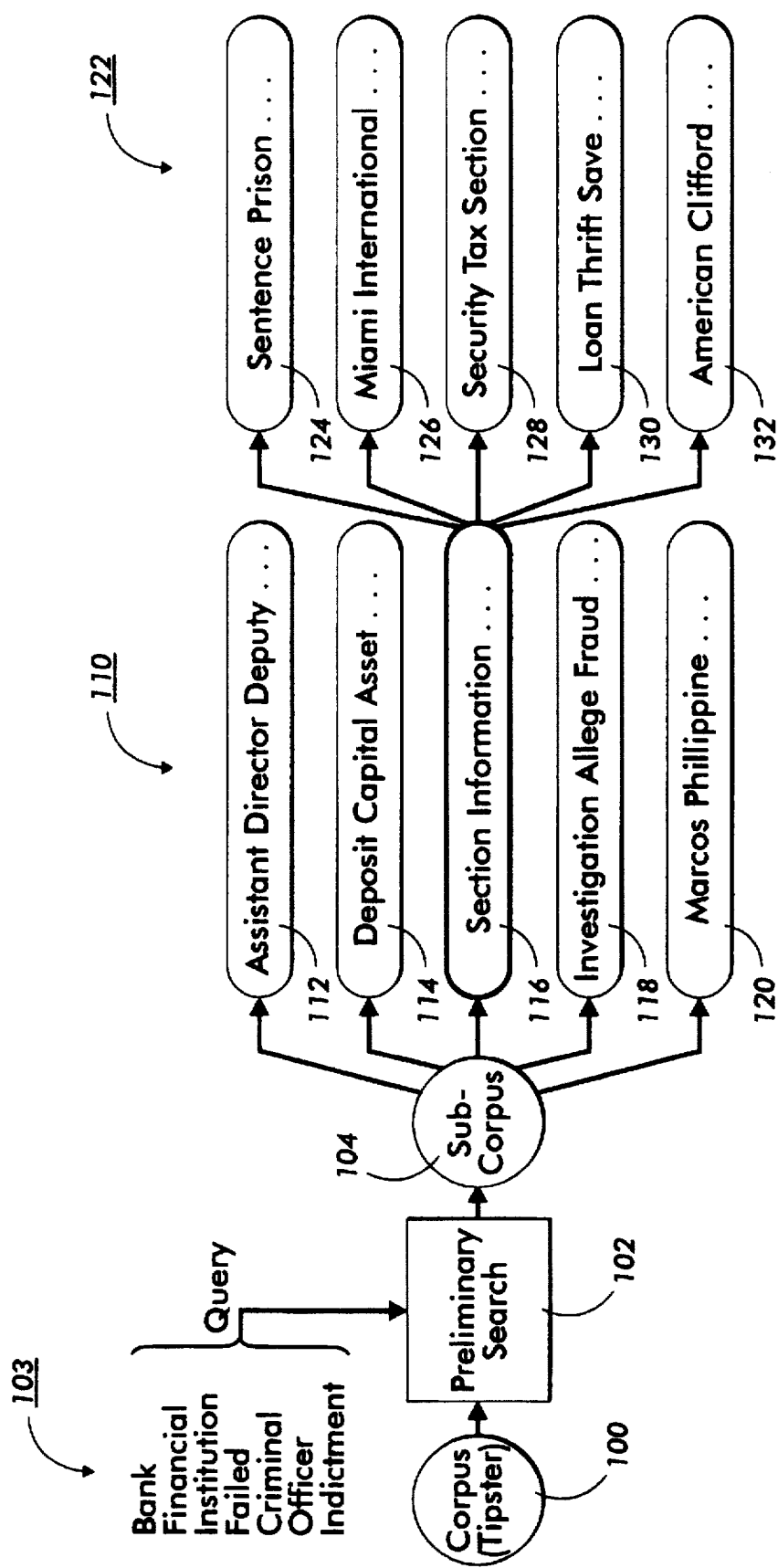
FIG. 5 is an illustrative diagram depicting a preferred embodiment of the document browsing method of the present invention being applied to a corpus of documents retrieved by a search.

To further illustrate the effect of the modified clustering rules represented in steps 88 (FIG. 3) and 92 (FIG. 4), An exemplary search-structure-summary-structure operation (FIG. 2) will be described with respect to FIGS. 5–8. Referring initially to FIG. 5, an initial corpus 100 is searched using a preliminary search 102 that is defined by a series of words 103 forming a query to produce a subcorpus 104. The subcorpus is defined for this example as documents identified in response to the query related to the topic "criminal actions against officers of failed financial institutions," and the actual search terms 103 included "bank, financial, institution, failed, criminal, officer, indictment" and the goal is to find documents related to the topic. To create the initial structure or partition, step 50 of FIG. 2, the disjoint clustering method of FIG. 3 is first applied to the subcorpus. The output of structuring step 50 is a set of five document clusters each having a primary topic, for example, clusters 112–120 as shown in group 110 of FIG. 5. It will be appreciated that it is possible to employ alternative numbers of clusters and the number may be specified by the user via the user interface. In the example, a user is presumed to have input "5" as the desired number of clusters. Subsequently, the user preferably selects only one of the clusters in group 110 based upon summary data presented as shown in FIG. 6. The output of the clustering operation being a list for each cluster, as indicated by step 90 of FIG. 3, it will be appreciated that such a list will preferably be stored in memory as a hierarchical structure so as to be recallable and formatable using any of a number of well-known user interface display techniques. Moreover, the cluster list data may also be recorded in a database or record format in RAM so as to be displayable/accessible using well-known database software. Accordingly, there is no intent to limit the present invention to the display examples that will be discussed below.

Turning to FIG. 6, displayed therein is an exemplary user interface screen 150 that displays a window 151a having five cluster windows 152, 154, 156, 158 and 160 contained therein. In each of the windows, there is displayed a banner 162 that contains, in left to right order, a selection button 164, a cluster number field 166, and a cluster size field 168. Also included in the banner 162 is a terms field 170 that contains one or more terms representative of the features identified as most prevalent during the similarity analysis or, in other words, the features most descriptive of the documents that have been structured into the cluster. As is seen in FIG. 6, the five clusters have various numbers of documents grouped therein. The documents are displayed in lists, each entry in the list containing in left-to-right order a document identifier, document title, and additional information (e.g., the name of the writer). In addition, the scrolling bar 172 to the right side of each window allows a user to scroll through each cluster's list using up and down arrow keys as is well known in windows-based user interfaces.

Continuing with FIG. 6, the result of the overlapping clustering operation is apparent if one looks closely at the listings in clusters 1 and 3 (reference numerals 152 and 156, respectively). Document number 334160 appears in both clusters. Thus, clusters 1 and 3 overlap by at least a single document. Moreover, if a user wished to further structure either of the two clusters, document 334160 would be retained and restructured regardless of whether cluster 1 or cluster 3 were selected via user interface window 151a.

Referring again to FIG. 5 in conjunction with FIG. 6, a user may choose to further review cluster 3. However, the cluster contains 217 entries and it may be desirable to further structure the cluster. As indicated in FIG. 6, the user's selection of a selectable unit—button 174 (shown darkened to indicate selection) triggers a second structuring of the subcorpus now defined by the 217 documents in cluster 3. Here again, the structuring (FIG. 2, step 56) is accomplished using one of the two possible overlapping cluster methods represented by the detailed steps of FIGS. 3 or 4. The results of the restructuring are illustrated in FIG. 5 as a group of clusters 122, again including a total of five clusters numbered 124, 126, 128, 130, and 132.

Turning now to FIG. 7, groups 122 of FIG. 5 are illustrated in the user interface window 151b, again as a series of five windows numbered 180, 182, 184, 186 and 188. As previously described with respect to FIG. 6, each of the windows contains a banner and a list section and associated buttons and information therein. As is apparent, there is more overlap present in the second iteration of the overlapping clusters as shown in FIG. 7. In particular, one will note that if a total of all documents appearing in each cluster is taken, the total adds up to a number greater than the 217 documents indicated to be in the subcorpus associated with cluster 3 in FIG. 6 (groups 116 of FIG. 5). In fact the total is approximately 25% greater, indicating that each of the clusters has approximately up to a 25% overlap of documents with one or more of the other clusters. Again, as an example of overlapping documents, it can be seen that cluster windows 184 and 186 both list document 366321 therein. It will be appreciated that the lists may be ordered in the cluster windows by descending order of their similarity to the cluster attractor (principal feature terms for which are listed in the terms field 170). Accordingly, those documents that overlap are likely to be lower in the lists as they are "added" to the clusters by extending the initial structures as previously described in detail with respect to the structuring operation of FIGS. 3 and 4.

Figure 8:
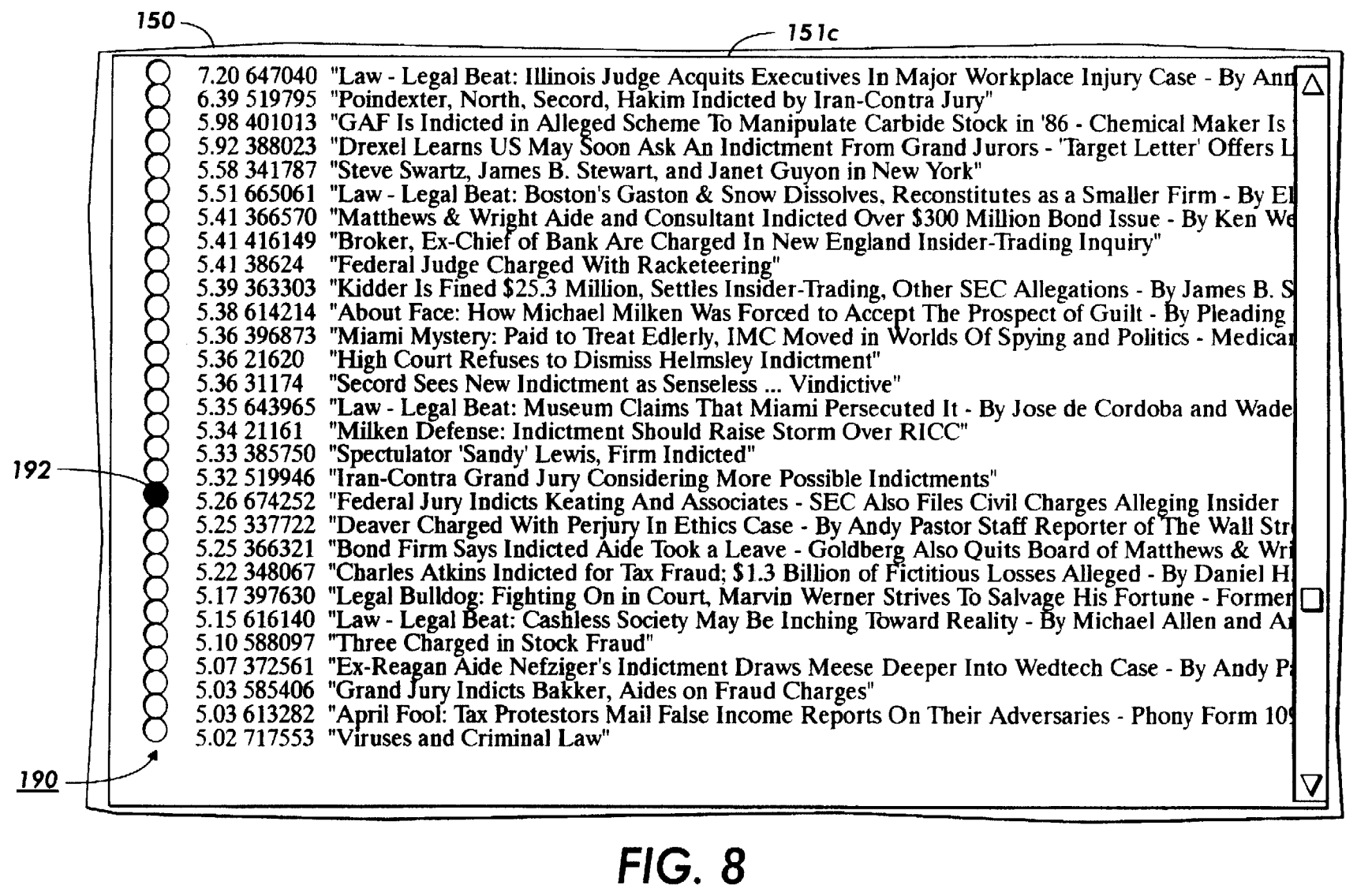

Referring briefly to FIG. 8, it is also possible for the user to select a particular cluster at this level (e.g., cluster 3 of FIG. 7) and to expand the window displaying that cluster as indicated by window 151c. It will be appreciated that a user may further select one or more documents from the enlarged view (or also from the smaller window views of FIGS. 6 and 7) so that the document may be retrieved, printed or otherwise selected for later use. Such a selection process is facilitated by the use of selection buttons 190 appearing along the left of window 151c, although selection may also be enabled by placement of a pointing device on the document line and indicating a selection. Those documents selected are preferably indicated by a darkened selection button, as indicated by button 192, by highlighting the document title or by reversing the text foreground and background colors of the document title.

As is illustrated by the above example, once a family of overlapping clusters has been established, a choice between favoring recall and favoring precision may be made implemented for a user. Recall is favored by using the overlapping clusters themselves. In fact, the overlaps are deliberately included to promote recall (admittedly at the expense of precision). However, if it is desired to emphasize precision, the present invention makes it possible to further define inner clusters using the afore-described techniques. In particular, inner clusters would be comprised of those documents appearing in only a single cluster after the overlapping cluster operations are performed as described above. In other words, use of inner clusters eliminates those documents that are close to the boundaries of the clusters of corresponding non-overlapping clusters. The steps associated with the determination of inner clusters are illustrated in FIG. 9.

Figure 9:
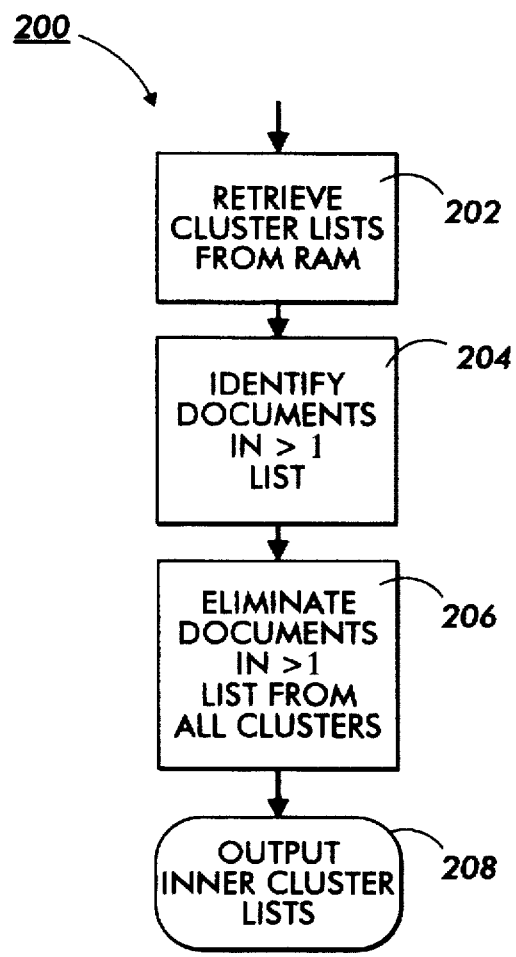
FIG. 9 is a flowchart illustrating the additional steps necessary to identify an inner cluster in accordance with the present invention.

Referring to FIG. 9, the data input to the inner cluster determination process 200 is the cluster lists generated at step 90 of FIG. 3. At step 202, the overlapping cluster lists are retrieved from RAM memory where they were stored as described above. It will be appreciated that the process of retrieving the list data may temporarily create a copy of the lists in a second section of RAM. Step 204 then identifies, from the retrieved list data, those documents that appear in more than one cluster list. Subsequently, step 206 modifies the list data stored in the second memory section by eliminating those documents identified in step 204 from all of the cluster lists in which they appear. The resulting output (step 208), data in the second memory section, then reflects clusters having only those documents that appeared in a single cluster. This output is then the inner cluster information that is more precise than that which is obtained either from a non-disjoint or a disjoint clustering of all documents in the input corpus. Alternatively, since the inner clusters need not span the next-upward cluster to which they belong, intermediate clusters can be defined corresponding to each of the overlapping clusters and consisting of all documents, in that overlapping cluster, for which the corresponding attractor is the closest attractor.

It will be further appreciated that the overlapping cluster aspect of the present invention may be applied to alternative searching or browsing applications. For example, overlapping clusters may be employed to precompute a hierarchical structure for a document corpus. Once precomputed, the resulting structure may be employed to improve the computational efficiency of query-based searches, by effectively reducing the number of documents to which the query metric must be applied.

In operation, overlapping clusters would be used to avoid the previously described problem of marginality. Preferably, the process would begin by subdividing a corpus of documents into the hierarchical structure. Each level of the structure consisting of clusters (nodes) that overlap to a certain extent with other clusters at the same hierarchical level. The structure would extend down to a level in which each cluster contained no more than a predefined maximum number of documents. Although precomputation of the hierarchical structure is perhaps computationally intensive, the advantage is that the entire corpus only need be subdivided once.

Once the subdivision is accomplished, keyword or other types of queries may be run against selected clusters or branches of the structure. Moreover, the clusters upon which such searching is done may be selected manually by a user, or automatically based upon summary data, e.g., its attractor, for each cluster. Once such a selection is accomplished, a subcorpus consisting of all documents in the selected clusters may be obtained, where the subcorpus contains fewer documents than the initial corpus from which it was selected. Preferably, the query is then executed against only the next-level clusters in this subcorpus to identify those documents in the subcorpus providing a positive response to the search query.

In recapitulation, the present invention is a method and apparatus for document clustering-based browsing of a corpus of documents, and more particularly to the use of overlapping clusters to improve recall. The present invention is directed to improving the performance of information access methods and apparatus through the use of non-disjoint (overlapped) clustering operations. The present invention is further described in terms of two possible methods for expanding document clusters so as to achieve the overlap, and a method for increasing precision through the use of the inner portions of the overlapping clusters.

It is, therefore, apparent that there has been provided, in accordance with the present invention, a method and apparatus for improving recall and precision in document browsing operations. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method, operating in a digital computer, for searching a corpus of documents, comprising the steps of:

preparing an initial structuring of the corpus into a plurality of primary overlapping clusters, wherein at least two of the plurality of primary overlapping clusters contain a single document, wherein the step of preparing an initial structuring of the corpus includes the steps of
 (a) identifying an attractor for each of a plurality of clusters,
 (b) including in each of the plurality of clusters all documents for which the cluster produces the closest attractor, and
 (c) adding to the cluster those additional documents numbering a predefined number of documents for which the cluster provides an attractor whose difference in closeness from the closest attractor is minimized; and determining a summary of the plurality of primary overlapping clusters prepared by said initial structuring of the corpus.

2. The method of claim 1, wherein the predefined number is determined as a fraction of the number of documents for which the cluster produces the closest attractor.

3. The method of claim 2, wherein the fraction of the number of documents is in the range of 0.10 to 0.25.

4. A method, operating in a digital computer, for searching a corpus of documents, comprising the steps of:

preparing an initial structuring of the corpus into a plurality of primary overlapping clusters, wherein at least two of the plurality of primary overlapping clusters contain a single document, wherein the step of preparing an initial structuring of the corpus includes the steps of
 (a) identifying an attractor for each of a plurality of clusters,
 (b) including in each of the plurality of clusters all documents for which the cluster produces the closest attractor, and
 (c) adding to the cluster those additional documents for which a cosine of the document with respect to the attractor of the cluster is at least equal to the largest cosine for the document minus a predefined value; and determining a summary of the plurality of primary overlapping clusters prepared by said initial structuring of the corpus.

5. The method of claim 4, wherein the predefined value is in the range of 0.05 to 0.10.

6. The method of claim 4, wherein the number of additional documents added to the cluster is limited to a predetermined fraction of the number of documents for which the cluster produces the closest attractor.

7. The method of claim 6, wherein the predetermined fraction of the number of documents is in the range of 0.10 to 0.25.

8. A method, operating in a digital computer, for searching a corpus of documents, comprising the steps of:

preparing an initial structuring of the corpus into a plurality of primary overlapping clusters, wherein at least two of the plurality of primary overlapping clusters contain a single document, wherein the step of defining an inner cluster associated with at least one of the plurality of primary overlapping clusters, includes the steps of
- (a) retrieving, from a first memory, data representing a summary of the plurality of primary overlapping clusters prepared by said initial structuring,
- (b) identifying, from the summary data, all documents appearing in more than one of said primary overlapping clusters,
- (c) modifying the summary data by eliminating those documents identified in step (b) from the summary data for each cluster in which it appears, and
- (d) storing the modified summary data in a second memory section so as to represent inner clusters consisting only of documents that appear in a single cluster;

determining a summary of the plurality of primary overlapping clusters prepared by said initial structuring of the corpus; and defining an inner cluster associated with at least one of the plurality of primary overlapping clusters, said inner cluster consisting of documents found only in the at least one of the plurality of primary overlapping clusters.

9. The method of claim 8, further including the steps of:
- (a) identifying all documents, in the primary overlapping cluster, for which a corresponding attractor is the closest attractor; and
- (b) defining as an intermediate cluster also associated with at least one of the plurality of primary overlapping clusters all documents identified in step (a).

10. A document search and retrieval method, operating in a digital computer, for searching a corpus of documents, comprising the steps of:

identifying, in response to at least one user specified search term, a sub-corpus of documents containing the at least one user specified search term;

preparing an initial structuring of the sub-corpus into a plurality of primary overlapping clusters, wherein at least two of the plurality of primary overlapping clusters contain a single document, wherein the step of preparing an initial structuring of the corpus includes the steps of
- (a) identifying an attractor for each of a plurality of primary overlapping clusters,
- (b) including in each of the plurality of primary overlapping clusters all documents for which the primary overlapping cluster produces the closest attractor, and
- (c) adding to the primary overlapping cluster those additional documents numbering a predefined number of documents included in step (b), for which the primary overlapping cluster produces a next closest attractor; and determining a summary of the plurality of primary overlapping clusters prepared by said initial structuring of the sub-corpus.

11. A document search and retrieval method, operating in a digital computer, for searching a corpus of documents, comprising the steps of:

identifying, in response to at least one user specified search term, a sub-corpus of documents containing the at least one user specified search term;

preparing an initial structuring of the sub-corpus into a plurality of primary overlapping clusters, wherein at least two of the plurality of primary overlapping clusters contain a single document, wherein the step of preparing an initial structuring of the corpus includes the steps of
- (a) identifying an attractor for each of a plurality of primary overlapping clusters,
- (b) including in each of the plurality of primary overlapping clusters all documents for which the primary overlapping cluster produces the closest attractor, and
- (c) adding to the primary overlapping cluster those additional documents for which a cosine of the document with respect to the attractor of the primary overlapping cluster is at least equal to the largest cosine for the document minus a predefined value; and determining a summary of the plurality of primary overlapping clusters prepared by said initial structuring of the sub-corpus.

* * * * *